(12) United States Patent
Berger

(10) Patent No.: US 9,688,317 B1
(45) Date of Patent: Jun. 27, 2017

(54) LOCKING RETRACTABLE TRAILER DECKING SYSTEM

(71) Applicant: Amazon Technologies, Inc., Reno, NV (US)

(72) Inventor: Carl Berger, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 266 days.

(21) Appl. No.: 14/307,368

(22) Filed: Jun. 17, 2014

(51) Int. Cl.
- *B65G 67/04* (2006.01)
- *B62D 33/04* (2006.01)
- *B65G 67/24* (2006.01)

(52) U.S. Cl.
CPC ........... *B62D 33/042* (2013.01); *B65G 67/04* (2013.01); *B65G 67/24* (2013.01)

(58) Field of Classification Search
CPC .... B62D 33/042; B62D 33/04; B62D 33/046; B65G 7/04; B65G 7/24; B60P 3/205; B60P 1/6427; B60P 7/15; B60P 7/14; B60P 7/135; E06B 9/15
USPC ......... 296/24.44; 414/800; 410/26; 211/151; 198/370.03
See application file for complete search history.

(56) References Cited

U.S. PATENT DOCUMENTS

| | | | | |
|---|---|---|---|---|
| 1,920,666 A | * | 8/1933 | Powell | B60P 1/006 198/629 |
| 1,970,899 A | * | 8/1934 | Renwick | B60P 1/52 193/35 R |
| 1,970,900 A | * | 8/1934 | Renwick | B60P 1/52 414/527 |
| 2,571,337 A | * | 10/1951 | Burnham | E02B 3/068 104/124 |
| 2,678,740 A | * | 5/1954 | Jones | B60P 1/52 193/35 A |
| 3,480,126 A | * | 11/1969 | Jung | B65G 51/03 193/35 A |
| 3,792,894 A | * | 2/1974 | Vande Water | B62D 33/042 187/268 |
| 3,891,102 A | * | 6/1975 | Blount | B60P 1/4421 211/118 |
| 3,944,037 A | * | 3/1976 | Stease | B65G 13/12 193/35 F |
| 4,094,546 A | * | 6/1978 | Glassmeyer | B62D 33/042 105/375 |
| 4,164,338 A | * | 8/1979 | Myron | B64C 1/20 193/35 F |
| 5,375,689 A | * | 12/1994 | Sapp | B65G 13/075 193/35 A |
| 6,189,593 B1 | * | 2/2001 | Katchur | E06B 9/18 160/133 |
| 6,302,179 B1 | * | 10/2001 | Miller | E06B 9/165 160/133 |

(Continued)

*Primary Examiner* — Gregory Adams
(74) *Attorney, Agent, or Firm* — Lowenstein Sandler LLP

(57) ABSTRACT

A retractable trailer decking system comprises a retractable decking configured to extend from a retracted position, along a pair of rails, to one of a plurality of extended positions. Each of the plurality of extended positions comprises a different length of usable retractable decking. In each of the plurality of extended positions, the retractable decking is configured to divide at least a portion of a cargo storage area into an upper cargo storage area and a lower cargo storage area, and a top surface of the retractable decking is configured to support cargo for storage in the upper cargo storage area.

19 Claims, 6 Drawing Sheets

(56) References Cited

U.S. PATENT DOCUMENTS

| | | | | |
|---|---|---|---|---|
| 7,021,456 | B2 * | 4/2006 | Haan | B65G 13/075 |
| | | | | 193/35 A |
| 7,465,143 | B1 * | 12/2008 | Adams | B60P 1/52 |
| | | | | 193/35 A |
| 2002/0046817 | A1 * | 4/2002 | Last | E04H 4/082 |
| | | | | 160/133 |
| 2010/0284775 | A1 * | 11/2010 | Germain | B65G 57/24 |
| | | | | 414/791.6 |
| 2012/0025556 | A1 * | 2/2012 | Rabarts | B60P 1/00 |
| | | | | 296/24.44 |
| 2012/0163940 | A1 * | 6/2012 | Westrick | B60P 1/00 |
| | | | | 410/52 |

* cited by examiner

LOCKING RETRACTABLE TRAILER DECKING SYSTEM

BACKGROUND

Inventory processing facilities, such as materials handling facilities, distribution warehouses, mail-order warehouses, and custom-order manufacturing facilities, maintain a vast physical inventory of items that are to be sold or shipped to customers around the world. Due to orders, shipments and other changes to the inventories, the need often arises to transport items between inventory processing facilities or to the customer. The inventory items are often transported using a semi-trailer, box, van, or other shipping container having a fixed size.

BRIEF DESCRIPTION OF THE DRAWINGS

Embodiments of the present invention will be understood more fully from the detailed description given below and from the accompanying drawings, which, however, should not be taken to limit the present invention to the specific embodiments, but are for explanation and understanding only.

DETAILED DESCRIPTION

Embodiments of an apparatus are described for a locking retractable trailer decking system. Shipping containers, such as semi-trailers, box trucks, vans, train cars, etc. are often used to transport or temporarily store cargo. Depending on the shape, size, quantity, orientation or other characteristics of the cargo, it may be difficult to maximize efficient use of the space in the semi-trailer. For example, certain cargo units, such as individual items or pallets of items, may be relatively short compared to the height of the semi-trailer, but the nature of the items may prevent them from being stacked on top of one another. As a result, there may be significant amounts of wasted space in the upper portions of the semi-trailer.

In one embodiment, a retractable trailer decking system may be used within the semi-trailer to increase the efficient use of space in the semi-trailer for storing or transporting cargo units. In one embodiment, a retractable decking may extend from one end of the semi-trailer, between a pair of rails, to form a horizontal surface that divides at east a portion the cargo storage area of the semi-trailer into an upper cargo storage area and a lower cargo storage area. When extended, cargo units can be stored both above the retractable decking, in the upper cargo storage area, and below the retractable decking, in the lower cargo storage area.

In one embodiment, the retractable decking is configurable to extend to multiple different lengths through the cargo storage area. Depending on the length to which the retractable decking is extended, in some embodiments, only a portion of the cargo storage area may be divided. In such an embodiment, the rest of the space in the cargo storage area that is not divided by the retractable decking may be used to store taller cargo units that would not fit above or below the retractable decking.

In one embodiment, the retractable decking is able to fully retract to one end of the semi-trailer. For example, the retractable decking may wrap or coil around a tension loaded support arm. When the retractable decking is fully retracted around the tension loaded support arm, the decking may occupy only a small area of the semi-trailer allowing the majority of the cargo space in semi-trailer to be used to store or transport cargo as if the retractable trailer decking system was not present.

The configurable nature of the retractable decking system described herein allows for multiple configurations depending on the business need. In one embodiment, the decking is strong enough to allow palletized freight to be stacked thereon. The retractable decking system allows multiple pallet sizes and shapes to be stacked in the semi-trailer, thus allowing for better trailer utilization.

Figure 1:
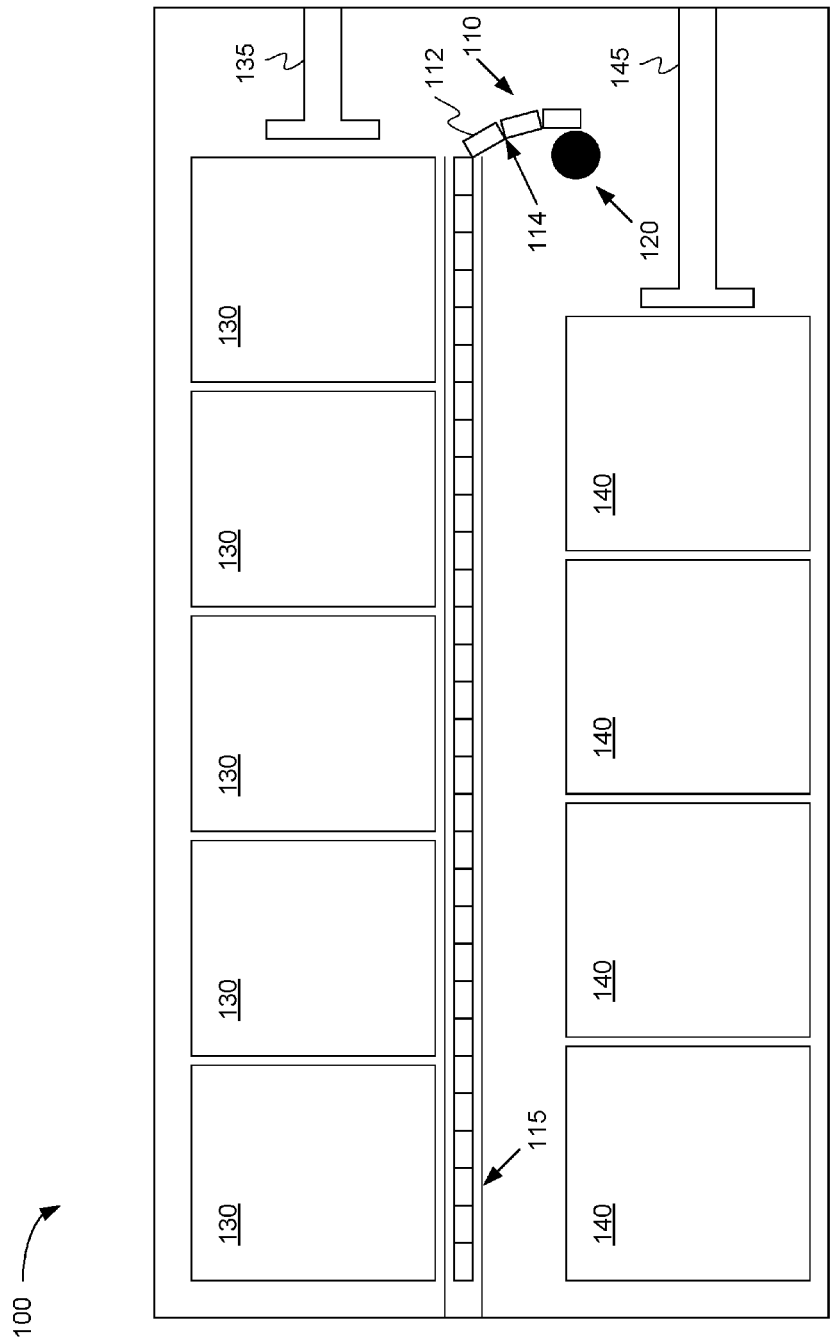
FIG. 1 is a block diagram illustrating a side view of a semi-trailer housing with a retractable decking system, according to an embodiment.

FIG. 1 is a block diagram illustrating a side view of a semi-trailer housing with a retractable decking system, according to an embodiment. In one embodiment, semi-trailer housing 100 is one example of a housing that includes the retractable decking system. In other embodiments, the retractable decking system described herein may be used in a box truck, a van, a train car, a shipping container, or any other housing or container having a fixed size. In one embodiment, semi-trailer housing 100 is designed to be supported and pulled by a road tractor, truck, or other motorized vehicle (not shown). The semi-trailer housing 100 may be designed to transport cargo from one location to another, to store cargo, or have some other intended use. The cargo may include individual items or may be packaged in inventory holders, such as boxes, pallets, bins, totes, cartons, etc.

In one embodiment, the retractable decking system includes a pair of rails 115. In one embodiment, each rail of the pair of rails 115 is attached to opposite sides of semi-trailer housing 100 and extends horizontally along a length of the semi-trailer housing 100. In one embodiment, the pair of rails 115 are located at a vertical level that is approximately half way between a floor and a ceiling of the semi-trailer housing 100. For example, if the vertical height of the semi-trailer housing 100 is ten feet, the pair of rails 1115 may be located at a height of approximately five feet from the floor. In other embodiments, the pair of rails 115 may be located at any other vertical level between the floor and the ceiling of the semi-trailer housing 100 in one embodiment, the pair of rails 115 are permanently affixed to the sides of the semi-trailer housing and the height is not adjustable. In another embodiment, however, the pair of rails 1115 are adjustable, so as to enable variation in the height of the rails depending on the cargo being transported in semi-trailer housing 100.

In one embodiment, the pair of rails 115 is designed to support a retractable decking 110. The retractable decking 110 may include multiple slats 112 of equal or unequal width that are coupled to adjacent slats by, e.g., a hinge 114 or other flexible or folding connection. The retractable decking 110 may retract at one end (e.g., a nose end) of semi-trailer housing 100 by rolling around a tension loaded support arm 120. The slats 112 may be of a width that allows configurability with respect to the retracting or extending length of the retractable decking 110 and that allows rolling of the retractable decking 110 around tension loaded support arm 120 in a space efficient manner. In one embodiment, the slats 112 may be approximately one foot in width; however, in other embodiments, the slats 112 may have some other width (e.g., three inches, six inches, nine inches, two feet). When extended, the slats 112 of the retractable decking 110 may slide between the pair of rails 115 forming a horizontal surface that divides the cargo storage area of the semi-trailer housing 100 into an upper cargo storage area and a lower cargo storage area. The upper cargo storage area, located above retractable decking 110, can be used to store cargo units 130, for example. The cargo units 130 (e.g., pallets) may sit on an upper surface of retractable decking 110 and be supported at one end by support arm 135. Support arm 135 prevents the cargo units 130 from sliding off the end of retractable decking 110 and onto tension loaded support arm 120. The lower cargo storage area, located below retractable decking 110, can be used to store cargo units 140, for example. The cargo units 140 (e.g., pallets) may sit on the floor of semi-trailer housing 100 and be supported at one end by support arm 145. Support arm 145 prevents the cargo units 140 from sliding into tension loaded support arm 120. Alternatively, retractable decking 110 and tension loaded support arm 120 may be compactly configured at the nose end of the cargo storage area such that one or both support arms 135, 145 may be unnecessary.

Figure 2:
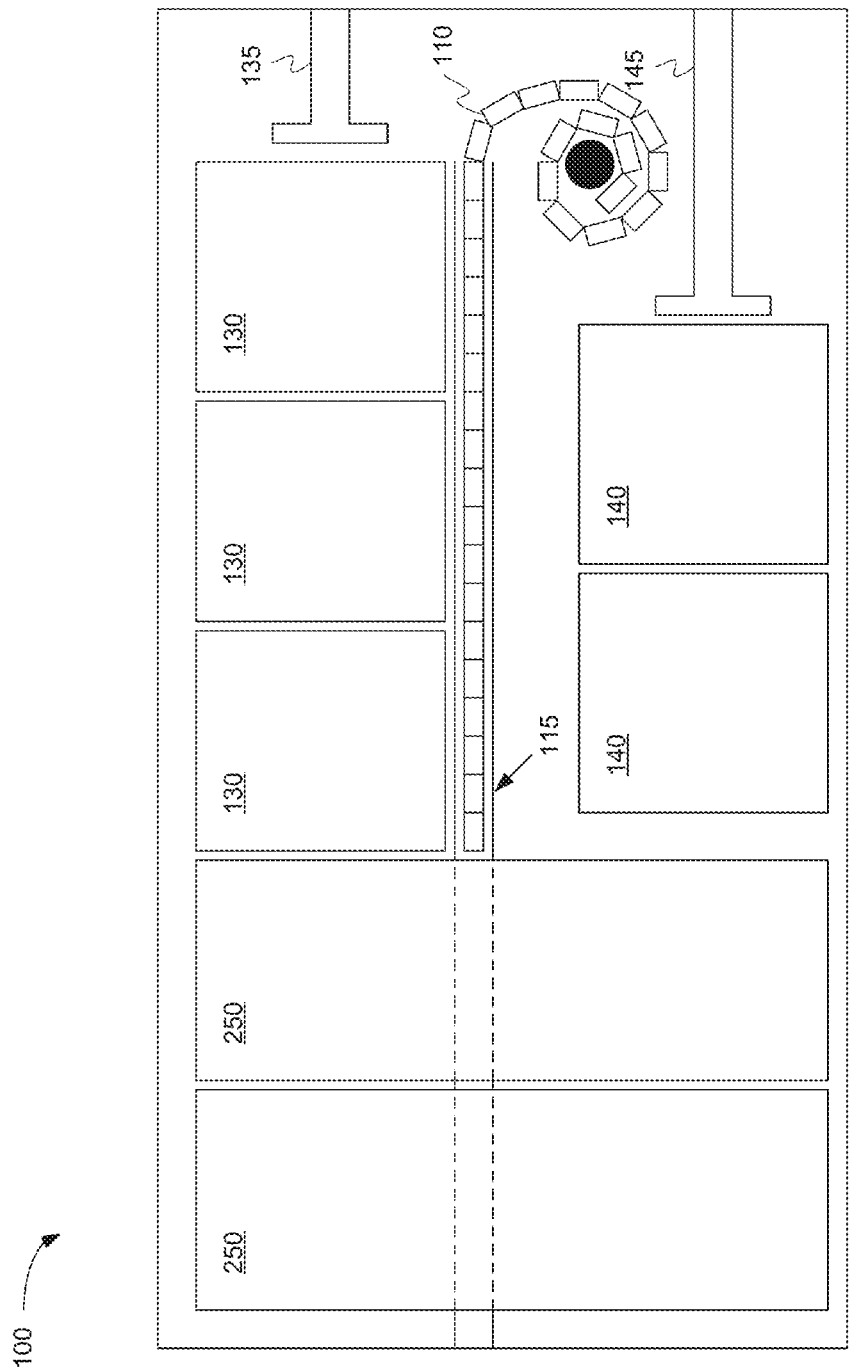
FIG. 2 is a block diagram illustrating a side view of a semi-trailer housing with a retractable decking system, according to an embodiment.

FIG. 2 is a block diagram illustrating a side view of a semi-trailer housing with a retractable decking system, according to an embodiment. In one embodiment, retractable decking 110 is able to extend to a plurality of different lengths along the pair of rails 115. Depending on the length to which the retractable decking 110 is extended, in some embodiments, only a portion of the cargo storage area of semi-trailer housing 100 may be divided into an upper cargo storage area and a lower cargo storage area. In such an embodiment, cargo units 130 may be stored on top of retractable decking 110 and cargo units 140 may be stored below retractable decking 110. The rest of the space in the cargo storage area that is not divided by retractable decking 110 may be used to store cargo units 250, for example. Cargo units 250 may be taller than cargo units 130 and 140, and thus would not fit in either the upper or lower cargo storage areas. Alternatively, cargo units of any other size, shape or configuration may be stored in the space in the cargo storage area that is not divided by retractable decking 110. In this manner, the length of retractable decking 110 is completely adjustable. Each rail of the pair of rails 115 may have some number of locking holes located along the length of the rails at various different positions. In one embodiment, the locking holes are spaced evenly along the rails at a fixed interval (e.g., every five feet), which corresponds roughly to the typical size of cargo units 130 and 140. Depending on the embodiment, however, there may be any number of locking holes into which locking pins at the end of retractable decking 110 may be inserted. As such, the retractable decking 110 may be extended to virtually any length along the pair of rails 115 to accommodate cargo loads of varying shapes and sizes. Although the Figures have been described with respect to locking holes and locking pins, other configurations of locking elements may be utilized, such as for example, hooks, fasteners, rods, ties, any other selectively lockable and releasable connections, or combinations thereof.

Figure 3:
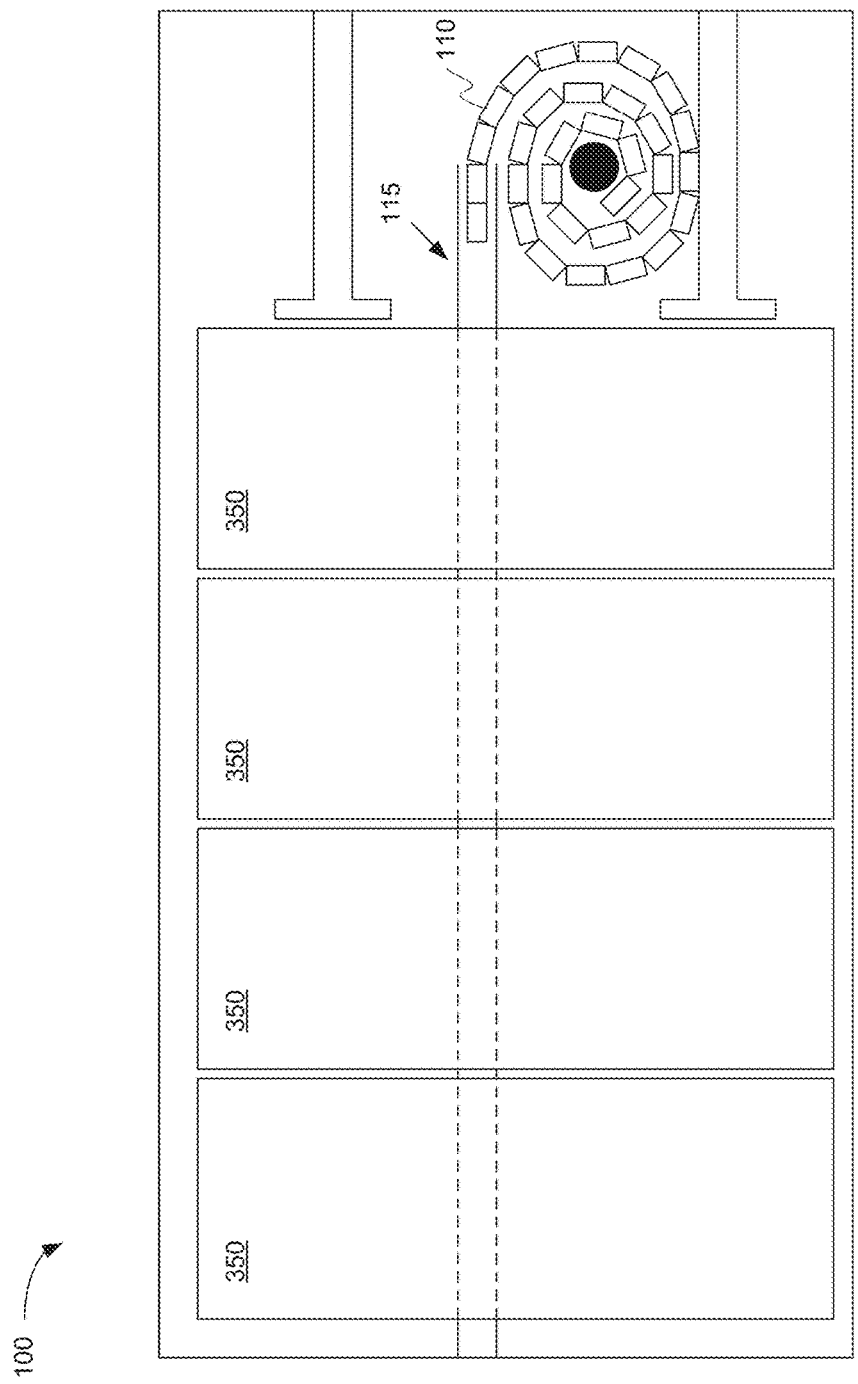
FIG. 3 is a block diagram illustrating a side view of a semi-trailer housing with a retractable decking system, according to an embodiment.

FIG. 3 is a block diagram illustrating a side view of a semi-trailer housing with a retractable decking system, according to an embodiment. In one embodiment, retractable decking 110 is able to fully retract away from cargo units 350 within the nose end of the semi-trailer housing 100. In one embodiment, the slats of retractable decking 110 wrap or coil around tension loaded support arm 120. Tension loaded support arm 120 may be spring loaded or configured with some other tension device to ease the ability to roll and unroll retractable decking 110 around support arm 120. In one embodiment, support arm 120 may be cylindrical and extend across a width of semi-trailer housing 110. In one embodiment, support arm 120 is located below the pair of rails 115, such that retractable decking 110 rolls down onto support arm 120 in a clockwise manner. In another embodiment, support arm 120 is located above the pair of rails 115, such that retractable decking 110 rolls up onto support arm 120 in a counter-clockwise manner. In one embodiment, tension loaded support arm 120 may be motorized to allow automatic extension and retracting of retractable decking 110 without an operator having to do so using their own power. For example, the operator may use motor controls to extend and retract the decking, rather than pushing or pulling the retractable decking 110. Although the Figures have been described with respect to a tension loaded support arm 120, other configurations for selectively retracting and extending the retractable decking 110 may be utilized, such as for example, folding decking, telescoping decking, extending scissor decking, any other selectively retractable and extendible configuration, or combinations thereof, any of which may be retracted or extended via automated, motorized and/or manual operation.

When retractable decking 110 is fully retracted around tension loaded support arm 120, the decking may occupy only a small area of semi-trailer housing 100. When retracted, the majority of the cargo space in semi-trailer housing 100 may be used to store or transport cargo. In one embodiment, oversized cargo units 350 may be stored in the cargo area. The oversized cargo units 350 may be of a shape and size that would prevent them from fitting in either the upper or lower cargo storage areas when the cargo area is divided by retractable decking 110. In this manner, semi-trailer housing 100 may be used essentially as it would have been absent the presence of the retractable decking system. In one embodiment, the retractable decking system may be completely removable so that semi-trailer housing 100 may be used in a traditional manner.

Figure 4:
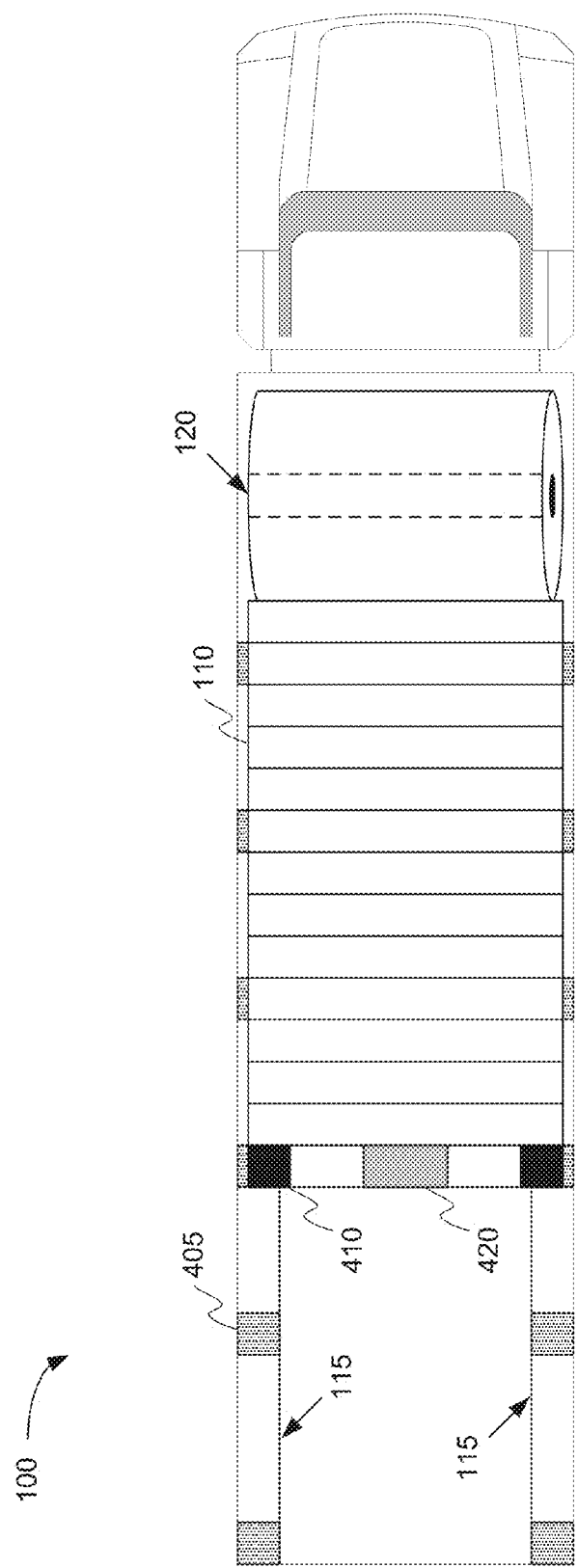
FIG. 4 is a block diagram illustrating a top view of a semi-trailer housing with a retractable decking system, according to an embodiment.

FIG. 4 is a block diagram illustrating a top view of a semi-trailer housing with a retractable decking system, according to an embodiment. In the illustrated embodiment, the retractable decking 110 is shown extending partially along the length of semi-trailer housing 100 through the pair of rails 115. In one embodiment, each rail of the pair of rails 115 includes multiple locking holes 405 (illustrated schematically) located at different locations along the rails to allow the retractable decking to extend to multiple different lengths. Each of the locking holes 405 may correspond to a different one of the extended positions. As discussed above, the locking holes 405 may be spaced evenly along the rails at a fixed interval, or there may be any number of locking holes 405 to allow for greater flexibility with respect to an extendible length of the retractable decking 110.

In one embodiment, the retractable decking 110 includes a decking locking component 410 (illustrated schematically). The decking locking component 410 may include a pair of sliding pins that are configured to slide into one of the locking holes 405 in the pair of rails 115. When inserted into the locking holes 405, the sliding pins of the decking locking component 410 secure the retractable decking 110 in place at one of the multiple available extended positions. In one embodiment, the retractable decking 110 may further include a handle 420 to allow for the extension and retraction of the retractable decking 110. In one embodiment, a human operator may use the handle 420 to manually extend and retract the retractable decking 110. In another embodiment, the handle 420 may function as a forklift connection to allow the operator to extend and retract the retractable decking 110 using a forklift or other powered industrial truck or vehicle.

Figure 5:
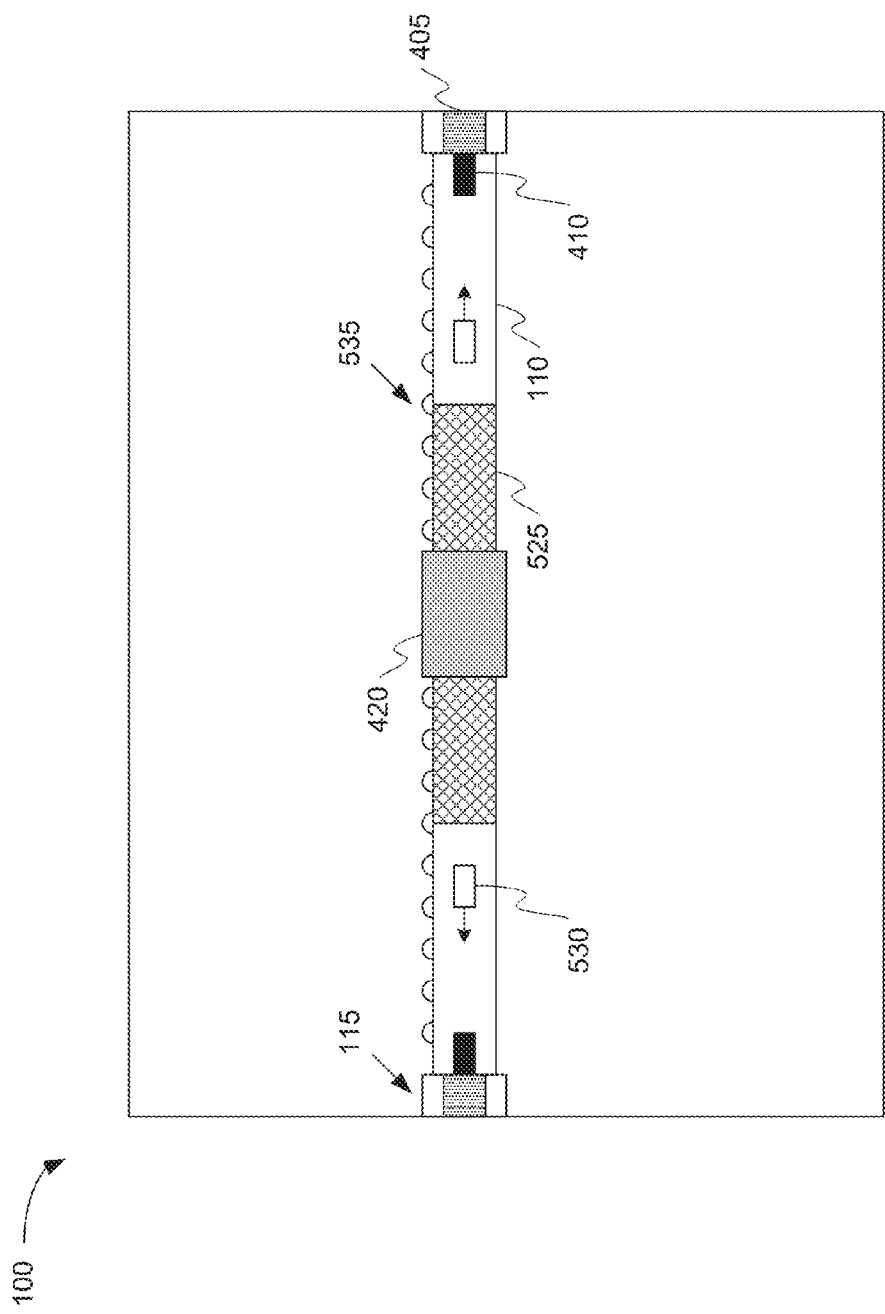
FIG. 5 is a block diagram illustrating an end view of a semi-trailer housing with a retractable decking system, according to an embodiment.

FIG. 5 is a block diagram illustrating an end view of a semi-trailer housing with a retractable decking system, according to an embodiment. In one embodiment, each rail of the pair of rails 115 includes multiple locking holes 405 located at different locations along the rails to allow the retractable decking 110 to extend to multiple different lengths. Each of the locking holes 405 may correspond to a different one of the extended positions.

In one embodiment, the retractable decking 110 includes a decking locking component with a pair of sliding pins 410 that are configured to slide into one of the locking holes 405 in the pair of rails 115. When inserted into the locking holes 405, the sliding pins 410 of the decking locking component secure the retractable decking 110 in place at one of the multiple available extended positions. In one embodiment, the sliding pins 410 are spring loaded, so no force is required to slide them into the locking holes 405. In one embodiment, the sliding pins 410 may be controlled via a mechanical or electrical connection to handle 420. For example, the sliding pins 410 may be pulled out when handle 420 is pushed, pulled, lifted or turned, and pushed in when handle 420 is released, so that the operator does not need to manually secure each of the sliding pins 410. Similarly, the handle 420 may function as a forklift connection so that an operator can extend or retract the retractable decking, as well as activate the decking locking component, while operating the forklift. For example, the forklift may push, pull, lift or turn handle 420 or press against bumper area 525 to activate the sliding pins 410.

In one embodiment, retractable decking 110 includes a number of casters 535 located on the top surface of the retractable decking 110. For example, the casters 535 may be spherical or cylindrical in shape, with at least a portion extending above the top surface of the retractable decking 110. The casters 535 may roll or otherwise rotate (e.g., in place or around a fixed access) in order to ease the sliding of cargo units 130 across the surface of retractable decking 110. For example, a cargo unit 130 may be placed at one end of the retractable decking 110 and slid along the surface of retractable decking 110, sliding along casters 535 until it reaches the nose end of retractable decking 110 (or hits support arm 135). In one embodiment, retractable decking 110 further includes a caster locking component 530 to lock the plurality of casters 535 in place and prevent movement of the cargo above the retractable decking 110. For example, when the operator engages caster locking component 530, friction or other pressure may be applied to one or more of the casters 535 from within the retractable decking 110 to prevent the casters 535 from rotating or otherwise moving. Alternatively, the casters 535 may be retracted away from the upper surface of the retractable decking 110, thereby lowering any cargo placed thereon into direct, frictional contact with the upper surface of the retractable decking 110.

Figure 6:
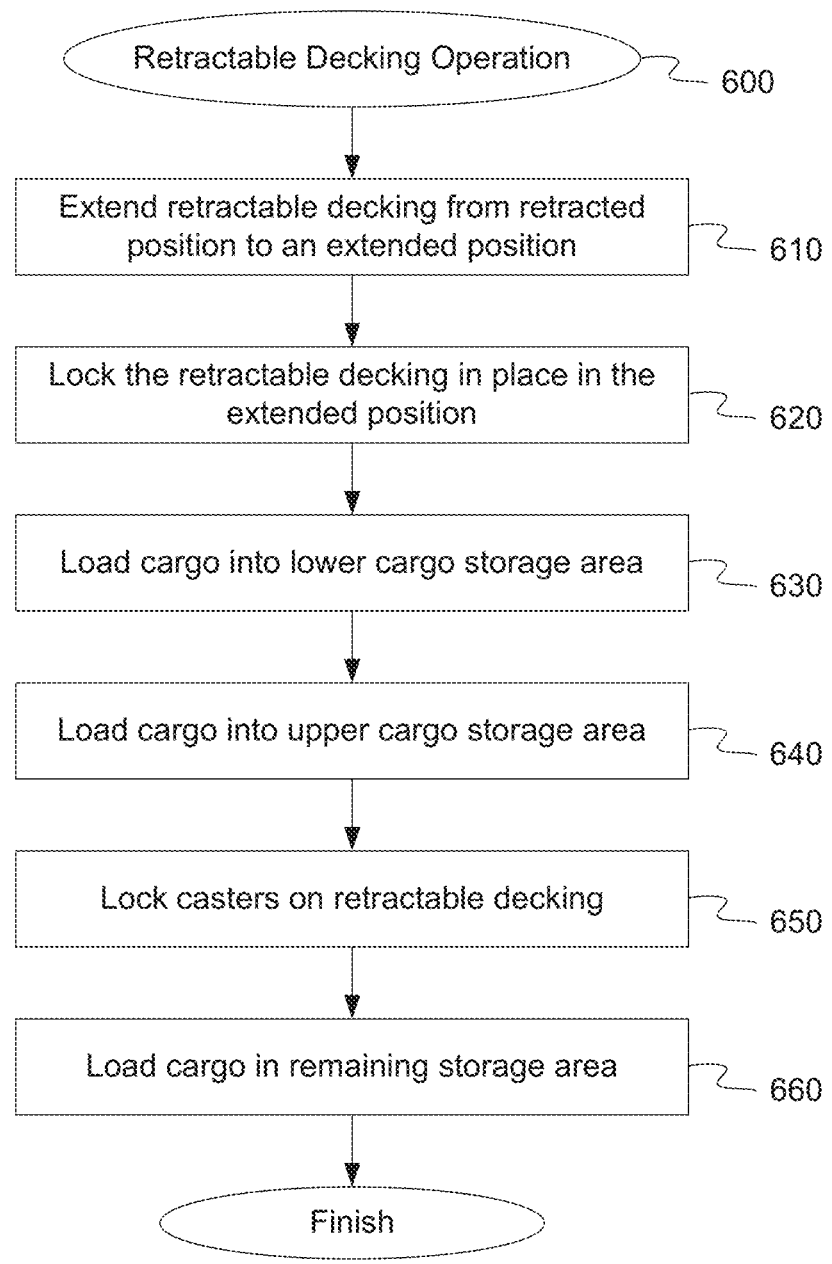
FIG. 6 is a flow diagram illustrating a method for retractable decking operation, according to an embodiment.

FIG. 6 is a flow diagram illustrating a method for retractable decking operation, according to an embodiment. The method 600 may be performed by the locking retractable trailer decking system described above with respect to FIGS. 1-5. In one embodiment, the method for retractable decking operation extends and retracts the retractable decking to divide at least a portion of a cargo storage area into an upper cargo storage area and a lower cargo storage area.

Referring to FIG. 6, at block 610, method 600 extends a retractable decking 110 from a retracted position, along a pair of rails 115, to one of a plurality of extended positions. In one embodiment, each of the plurality of extended positions comprises a different length of usable retractable decking 110. When the retractable decking 110 is extended into one of the plurality of extended positions, the retractable decking 110 divides at least a portion of a cargo storage area into an upper cargo storage area and a lower cargo storage area. A top surface of the retractable decking 110 is configured to support cargo units 130 for storage in the upper cargo storage area, and cargo units 140 may be stored below retractable decking 110.

At block 620, method 600 locks the retractable decking 110 into place in the selected one of the plurality of extended positions. In one embodiment, the pair of sliding pins 410 are slid into respective locking holes 405 in the pair of rails 115. When inserted into the locking holes 405, the sliding pins 410 of the decking locking component secure the retractable decking 110 in place. The sliding pins 410 may be engaged either automatically (e.g., spring-loaded), manually by an operator or with the aid of a forklift or other vehicle.

At block 630, method 600 loads cargo into the lower cargo storage area. The lower cargo storage area, located below retractable decking 110, can be used to store cargo units 140. The cargo units 140 (e.g., pallets) may sit on the floor of semi-trailer housing 100 and, optionally, be supported by support arm 145. For example, a cargo unit 140 may be placed at one end of the floor of semi-trailer housing 100 and slid along the floor until it reaches the nose end of housing 100 (or hits support arm 145). Alternatively, a first cargo unit 140 may be placed at one end of the floor of semi-trailer housing 100 and slid partially toward the nose end of the housing 100, then another cargo unit 140 may be placed at the one end of the floor of the housing 100 and slid partially toward the nose end of the housing 100, consequently pushing the first cargo unit 140 further toward the nose end of the housing 100, and the process may be repeated until the lower cargo storage area below the decking 110 is loaded as desired, e.g., fully loaded. Optional support arm 145 may prevent the cargo units 140 from sliding into tension loaded support arm 120. Alternatively, cargo units of any other size, shape or configuration may be stored in the lower cargo storage area below the retractable decking 110.

At block 640, method 600 loads cargo into the upper cargo storage area. The upper cargo storage area, located above retractable decking 110, can be used to store cargo units 130. The cargo units 130 (e.g., pallets) may sit on an upper surface of retractable decking 110 and, optionally, be supported by support arm 135. Optional support arm 135 may prevent the cargo units 130 from sliding, off the end of retractable decking 110 and onto tension loaded support arm 120. Alternatively, cargo units of any other size, shape or configuration may be stored in the upper cargo storage area above the retractable decking 110. In one embodiment, retractable decking 110 includes a number of casters 535 located on the top surface of the retractable decking 110. For example, a cargo unit 130 may be placed at one end of the retractable decking 110 and slid along the surface of retractable decking 110, sliding along casters 535 until it reaches the nose end of retractable decking 110 (or hits support arm 135). Alternatively, a first cargo unit 130 may be placed at one end of the retractable decking 110 and slid along casters 535 of the retractable decking 110 partially toward the nose end of the housing 100, then another cargo unit 130 may be placed at the one end of the retractable decking 110 and slid along casters 535 of the retractable decking 110 partially toward the nose end of the housing 100, consequently pushing the first cargo unit 130 further toward the nose end of the housing 100, and the process may be repeated until the upper cargo storage area above the decking 110 is loaded as desired, e.g., fully loaded. In one embodiment, the order of loading may be reversed such that the upper cargo storage area is loaded before the lower cargo storage area. In other embodiments, cargo units may be alternately or intermittently placed loaded into both the upper and lower cargo storage areas.

At block 650, method 600 locks the casters 535 in retractable decking 110. In one embodiment, retractable decking 110 includes a caster locking component 530 to lock the plurality of casters 535 in place and prevent movement of the cargo above the retractable decking 110. For example, when the operator engages caster locking component 530, friction or other pressure may be applied to the casters 535 from within the retractable decking 110 to prevent the casters 535 from rotating or otherwise moving. Alternatively, the casters 535 may be retracted away from the upper surface of the retractable decking 110, thereby lowering any cargo placed thereon into direct, frictional contact with the upper surface of the retractable decking 110.

At block 660, if retractable decking 110 is not extended along the full length of semi-trailer housing 100, method 600 may load cargo into the remaining space not divided into upper and lower cargo storage areas. The rest of the space in the cargo storage area that is not divided by retractable decking 110 may be used to store cargo units 250, for example. Cargo units 250 may be taller than cargo units 130 and 140, and thus would not fit in either the upper or lower cargo storage areas. Alternatively, cargo units of any other size, shape or configuration may be stored in the space in the cargo storage area that is not divided by retractable decking 110.

Then, the cargo that has been loaded into the housing 100 may be transported, stored or otherwise managed as desired. After such transport, storage or management of the cargo as desired, method 600 may be substantially reversed in order to unload the cargo from semi-trailer housing 100. For example, cargo units 250 are unloaded from space in the cargo storage area that is not divided by retractable decking 110, if any. Then, casters 535 on the retractable decking 110 may be unlocked, and cargo units 130 may be unloaded from the upper cargo storage area above retractable decking 110. Then, cargo units 140 may be unloaded from the lower cargo storage area below retractable decking 110. Then, the retractable decking 110 may be unlocked from its extended position. Finally, the retractable decking 110 may be retracted from the selected one of the plurality of extended positions to the retracted position. In one embodiment, when in the retracted position, the retractable decking 110 is configured to roll around a tension loaded support arm 120, allowing the full height of the cargo storage area to be used for storage of cargo units 250. Alternatively, after removing cargo units 250 from space in the cargo storage area that is not divided by retractable decking 110 and after unlocking casters 535 on the retractable decking 110, a first cargo unit 130 and a first cargo unit 140 may be removed from the upper cargo storage area and the lower cargo storage area, respectively. Then, retractable decking 110 may be retracted to a next retracted position (e.g., pushed back approximately the length of one of cargo units 130 or 140). The cargo units 130 in the upper cargo storage area may be held in position by optional support arm 135 or the nose end of housing 100, while sliding along the casters 535 such that the next cargo units 130 and 140 may be accessible and unloaded from the extended end of retractable decking 110. Unloading and retracting may continue in this manner until all cargo is unloaded from semi-trailer housing 100, following which the retractable decking 110 may be in a substantially fully retracted position.

The foregoing description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of embodiments of the present invention.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. An apparatus comprising:
   a housing surrounding a cargo storage area; and
   a retractable decking system coupled within the housing, the retractable decking system comprising:
      a pair of rails extending horizontally along a length of the housing at a vertical level between a floor and a ceiling of the housing, wherein a first rail of the pair of rails extends along a first side of the housing and a second rail of the pair of rails extends along a second side of the housing; and
      a retractable decking configured to retract at an end of the housing by rolling around a support arm and configured to extend between the pair of rails along the length of the housing and divide at least a portion of the cargo storage area into an upper cargo storage area and a lower cargo storage area, the retractable decking comprising a plurality of slats of equal width, wherein each of the plurality of slats extends between the first rail and the second rail, the retractable decking configured to extend to a plurality of different lengths along the pair of rails and configured to allow storage of cargo above the retractable decking in the upper cargo storage area and below the retractable decking in the lower cargo storage area, the retractable decking comprising a plurality of casters and a caster locking component comprising a component attached internally to the retractable decking, wherein the component is configured for movement laterally relative to the retractable decking to apply lateral friction to the plurality of casters.

2. The apparatus of claim 1, wherein the retractable decking system further comprises:
a decking locking component comprising a pair of sliding pins, wherein each pin of the pair of sliding pins is configured to slide into one of a plurality of locking holes in one of the first and second rails, the plurality of locking holes located at different locations to allow the retractable decking to extend to the plurality of different lengths.

3. The apparatus of claim 1, wherein the retractable decking further comprises at least one of:
a handle configured to allow an operator to manually extend or retract the retractable decking; or
a forklift connection configured to allow an operator to extend or retract the retractable decking using a vehicle.

4. The apparatus of claim 1, wherein the plurality of casters are located on a top surface of the retractable decking, the plurality of casters configured to allow sliding of the cargo along the top surface of the retractable decking and through the upper cargo storage area.

5. An apparatus comprising:
a retractable decking configured to extend from a retracted position, along a pair of rails, to one of a plurality of extended positions within a cargo storage area, wherein each of the plurality of extended positions comprises a different length of usable retractable decking, wherein in each of the plurality of extended positions, the retractable decking is configured to divide at least a portion of the cargo storage area into an upper cargo storage area and a lower cargo storage area, and wherein a top surface of the retractable decking is configured to support cargo for storage in the upper cargo storage area, the retractable decking comprising a plurality of casters and a caster locking component comprising a component attached internally to the retractable decking, wherein the component is configured for movement laterally relative to the retractable decking to apply lateral friction to the plurality of casters.

6. The apparatus of claim 5, wherein each rail of the pair of rails comprises a plurality of locking holes located at different locations, each of the plurality of locking holes corresponding to a different one of the plurality of extended positions.

7. The apparatus of claim 6, wherein the retractable decking comprises a decking locking component comprising a pair of sliding pins, wherein each pin of the pair of sliding pins is configured to slide into one of the plurality of locking holes in one of the pair of rails to lock the retractable decking into place at one of the plurality of extended positions.

8. The apparatus of claim 5, wherein the retractable decking comprises a plurality of slats of equal width, wherein each of the plurality of slats extends between the pair of rails and is coupled to a hinge between adjacent slats.

9. The apparatus of claim 8, wherein in the retracted position, the plurality of slats of the retractable decking is configured to roll around a support arm.

10. The apparatus of claim 5, wherein the retractable decking comprises a handle configured to allow an operator to manually extend the retractable decking into one of the plurality of extended positions or to retract the retractable decking into the retracted position.

11. The apparatus of claim 5, wherein the retractable decking comprises a connection configured to allow an operator to extend the retractable decking into one of the plurality of extended positions or to retract the retractable decking into the retracted position using a powered industrial vehicle.

12. The apparatus of claim 5, wherein the plurality of casters is located on the top surface of the retractable decking, the plurality of casters configured to allow sliding of the cargo along the top surface of the retractable decking and through the upper cargo storage area.

13. A method comprising:
extending a retractable decking from a retracted position, along a pair of rails, to one of a plurality of extended positions within a cargo storage area, the retractable decking comprising a plurality of casters, wherein each of the plurality of extended positions comprises a different length of usable retractable decking, wherein in each of the plurality of extended positions, the retractable decking is configured to divide at least a portion of the cargo storage area into an upper cargo storage area and a lower cargo storage area;
loading cargo into the upper cargo storage area, wherein a top surface of the retractable decking is configured to support the cargo for storage; and
locking the plurality of casters against rotation by laterally engaging the plurality of casters with a locking component thereby applying lateral friction to the plurality of casters.

14. The method of claim 13, wherein each rail of the pair of rails comprises a plurality of locking holes located at different locations, each of the plurality of locking holes corresponding to a different one of the plurality of extended positions and wherein the retractable decking comprises a decking locking component comprising a pair of sliding pins.

15. The method of claim 14, further comprising:
locking the retractable decking in place at one of the plurality of extended positions, wherein the locking comprises inserting the pair of sliding pins into a pair of holes of the plurality of locking holes in the pair of rails.

16. The method of claim 13, further comprising:
loading a first cargo unit into the lower cargo storage area; and
loading a second cargo unit into the upper cargo storage area, wherein the second cargo unit slides along the plurality of casters located on the top surface of the retractable decking.

17. The method of claim 13, further comprising:
retracting the retractable decking from the one of the plurality of extended positions to the retracted position, wherein in the retracted position, the retractable decking is configured to roll around a support arm.

18. The method of claim 17, wherein extending and retracting the retractable decking comprises engaging a connection to allow an operator to extend the retractable decking into one of the plurality of extended positions or to retract the retractable decking into the retracted position via at least one of manual operation or a powered industrial vehicle.

19. The method of claim 17, wherein retracting the retractable decking comprises:
- removing a first cargo unit from the lower cargo storage area;
- unlocking a plurality of casters located on the top surface of the retractable decking to allow movement of a second cargo unit on the retractable decking in the upper cargo storage area;
- removing the second cargo unit from the upper cargo storage area;
- retracting the retractable decking from a first position of the plurality of extended positions to a second position of the plurality of extended positions, the second position located closer to the support arm than the first position;
- removing a third cargo unit from the lower cargo storage area; and
- removing a fourth cargo unit from the upper cargo storage area.

* * * * *